US010608895B2

(12) United States Patent
Shaw et al.

(10) Patent No.: US 10,608,895 B2
(45) Date of Patent: Mar. 31, 2020

(54) QUALITY OF SERVICE MANAGEMENT FOR DYNAMIC INSTANTIATION OF NETWORK SLICES AND/OR APPLICATIONS

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 29 days.

(21) Appl. No.: 15/476,856

(22) Filed: Mar. 31, 2017

(65) Prior Publication Data

US 2018/0287891 A1    Oct. 4, 2018

(51) Int. Cl.
| | | |
|---|---|---|
| H04W 72/00 | (2009.01) | |
| H04L 12/24 | (2006.01) | |
| H04W 28/24 | (2009.01) | |
| H04L 29/06 | (2006.01) | |
| H04L 12/725 | (2013.01) | |
| H04L 29/08 | (2006.01) | |
| H04W 24/02 | (2009.01) | |
| H04L 12/911 | (2013.01) | |

(Continued)

(52) U.S. Cl.
CPC ...... *H04L 41/5003* (2013.01); *H04L 41/5051* (2013.01); *H04L 45/302* (2013.01); *H04L 47/78* (2013.01); *H04L 47/805* (2013.01); *H04L 65/80* (2013.01); *H04L 67/14* (2013.01); *H04L 67/322* (2013.01); *H04W 24/02* (2013.01); *H04W 28/24* (2013.01); *H04W 48/18* (2013.01)

(58) Field of Classification Search
CPC ............ H04L 41/5003; H04L 41/5051; H04L 43/0876; H04L 45/302; H04L 47/14; H04L 47/2433; H04L 65/80; H04L 47/2458; H04W 28/24; H04W 72/10; H04W 72/048
See application file for complete search history.

(56) References Cited

U.S. PATENT DOCUMENTS 7,643,442 B1   1/2010   Calhoun
7,801,032 B2   9/2010   Liu
(Continued)

FOREIGN PATENT DOCUMENTS

WO    2017001630 A1    1/2017

OTHER PUBLICATIONS

Gupta et al. "SDFog: A Software Defined Computing Architecture for QoS Aware Service Orchestration over Edge Devices." arXiv preprint arXiv:1609.01190 (2016). Retrieved on Jan. 7, 2017, 8 pages.

(Continued)

*Primary Examiner* — Barry W Taylor
(74) *Attorney, Agent, or Firm* — Amin, Turocy & Watson, LLP

(57) ABSTRACT

Network and/or application resources can be dynamically instantiated based on quality of service (QoS) data. In one aspect, different QoS levels can be assigned for different segments of a content delivery session, for example, based on subscription and/or policy data. Further, the QoS levels can be varied in response to changes in user experience and/or expectation. Furthermore, core network slices can be instantiated and/or updated based on the QoS levels.

20 Claims, 10 Drawing Sheets

(51) Int. Cl.
*H04L 12/927* (2013.01)
*H04W 48/18* (2009.01)

(56) References Cited

U.S. PATENT DOCUMENTS

| | | |
|---|---|---|
| 8,174,970 B2 | 5/2012 | Adamczyk et al. |
| 8,631,213 B2 | 1/2014 | Biswas et al. |
| 9,009,340 B2 | 4/2015 | Thompson |
| 2002/0087699 A1 | 7/2002 | Karagiannis et al. |
| 2007/0180030 A1 | 8/2007 | Xu et al. |
| 2008/0039097 A1 | 2/2008 | Sathyanarayan |
| 2012/0106348 A1 | 5/2012 | Janakiraman et al. |
| 2015/0134770 A1* | 5/2015 | Heinz, II ............... H04L 47/24 709/217 |
| 2015/0163273 A1* | 6/2015 | Radcliffe ............... H04L 65/602 709/231 |
| 2016/0127945 A1 | 5/2016 | Cui et al. |
| 2016/0352924 A1 | 12/2016 | Senarath et al. |
| 2016/0353268 A1* | 12/2016 | Senarath ............... H04W 4/24 |
| 2016/0360439 A1 | 12/2016 | Phan et al. |
| 2017/0054595 A1* | 2/2017 | Zhang ............... H04L 41/0896 |
| 2017/0366587 A1* | 12/2017 | Sharifi ............... H04L 65/4069 |
| 2018/0176858 A1* | 6/2018 | Wang ............... H04W 48/18 |

OTHER PUBLICATIONS

"5G Systems", Ericsson White Paper, UEN 284-23-3251 rev B | Jan. 2017. [https://www.ericsson.com/assets/local/publications/white-papers/wp-5g-systems.pdf], Retrieved on Mar. 3, 2017, 14 pages.

\* cited by examiner

QUALITY OF SERVICE MANAGEMENT FOR DYNAMIC INSTANTIATION OF NETWORK SLICES AND/OR APPLICATIONS

TECHNICAL FIELD

The subject disclosure relates to wireless communications, e.g., quality of service (QoS) management for dynamic instantiation of network slices and/or applications.

BACKGROUND

As communication networks evolve, next generation mobile communication technologies (e.g., fifth generation (5G) technology) aim to improve customers' quality of service (QoS) and provide different QoS guarantees for a wide range of services, applications, and users that have extremely diverse requirements. Providing a QoS guarantee can have inherent difficulties, e.g., node mobility, multi-hop communication, resource allocation, and lack of central coordination. Further, a massive amount of bursty data, multi-radio access technologies (RATs), and/or low latency requirements for different applications and services can create new challenges for the networking infrastructure providers to develop innovative and intelligent networking solutions that can deliver the desired QoS.

Further, during content delivery, conventional networks can simply increase a raw speed (e.g., uplink and downlink bandwidth) for delivery of the content. Moreover, conventional networks can deliver content according to a static QoS level assigned to the content. These mechanisms are inflexible and can oftentimes negatively affect end user service quality.

DETAILED DESCRIPTION

Figure 1:
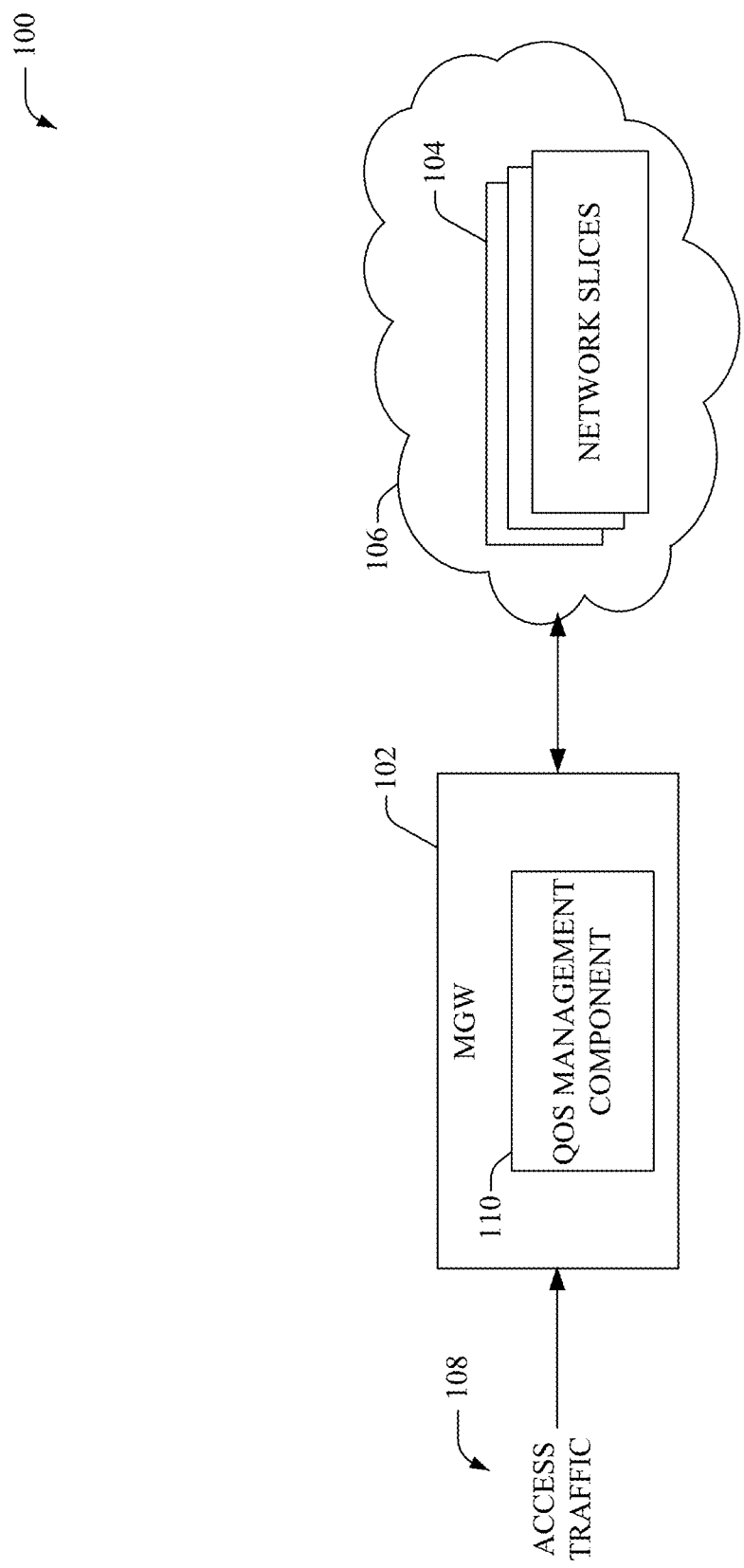
FIG. 1 illustrates an example system that facilitates dynamic management of core network slices based on quality of service (QoS) data.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

A conventional mobile core network delivers content in accordance with a static quality of service (QoS) level assigned to the content. Moreover, the QoS of the content cannot be changed during a content delivery session and remains constant for the entire duration of the content delivery session. The systems and methods disclosed herein enable assignment of varying QoS levels for different segments of the content that can be assigned according to subscription and/or policy data. In one aspect, core network slices can be instantiated and/or updated based on the QoS levels. Aspects and/or features of the disclosed subject matter can be exploited in substantially any wired or wireless communication technology, including, but not limited to 5G and/or future technologies.

Referring initially to FIG. 1, there illustrated is an example system 100 that facilitates dynamic management of core network slices based on QoS data, according to one or more aspects of the disclosed subject matter. As an example, a core network of a communication network can comprise devices (e.g., gateways, servers, data stores, etc.) that provide communication services to user equipment (UE), which are connected to the communication network via a wired and/or wireless access network. Future communication services demand a flexible and programmable network that can support a broad range of applications that have different service requirements.

In one aspect, system 100 employs a scalable and flexible architecture wherein a management gateway (mGW) 102 is utilized to manage (e.g., instantiate, update, delete, etc.) one or more network slices 104 of core network 106. In one example, the network slice 104 can comprise a logical/virtual replication of core network elements employed to enable a specified service. Moreover, the network slices 104 can comprise virtual networks built on top of a common/shared physical infrastructure. As an example, the virtual networks refer to implementing the functions of infrastructure nodes in software on commercial "off-the-shelf" computing equipment. Virtualization can decrease capital and/or operating costs, reduce time for deployment of new services, improve energy savings, and/or enhance network efficiency. In one aspect, the network slices 104 can be customized (e.g., in terms of resources allocated, latency, bandwidth, etc.) for respective services handled by the network slices 104. This enables operators to provide networks on an as-a-service basis, which can significantly improve operational efficiency and/or reduce time-to-market for new services. In one example, the network slices 104 can be implemented via one or more gateway devices (e.g., legacy gateways, control plane gateways and/or user plane gateways) that perform functions of, but not limited to, switches, routers, repositories, policies, home location register (HLR), serving GPRS support node (SGSN), gateway GPRS support node (GGSN), combined GPRS support node (CGSN), radio network controller (RNC), serving gateway (SGW), packet data network gateway (PGW), residential gateway (RGW), broadband remote access server (BRAS), carrier grade network address translator (CGNAT), deep packet inspection (DPI), provider edge (PE) router, mobility management entity (MME), element management system (EMS), etc.

Conventional networks connect access traffic to the core network through a mobility management entity (MME) interface. In contrast, system 100 can utilize the mGW 102 to facilitate routing of the access traffic 108 to appropriate network slices 104. In one example, the mGW 102 can be a logical service with a subset of gateway functionality, located at one or more nodes in the access network. According to an embodiment the mGW 102 can comprise (and/or be coupled to) a QoS management component 110 that is utilized to assign variable and/or multiple QoS levels to a service handled by the mGW 102. Moreover, the mGW 102 can utilize the QoS levels to update a network slice 104 handling the service and/or instantiate a new network slice 104 to handle the service.

The architecture disclosed in system 100 facilitates application of network functions virtualization (NFV) and/or software-defined networking (SDN) technologies. NFV can virtualize network services that have been conventionally carried out by proprietary, dedicated hardware/software and instead host the network services on one or more virtual machines (VMs). Using NFV, network service providers do not need to purchase proprietary/dedicated hardware devices to enable a service. NFV can improve scalability and flexibility and network capacity can easily be adjusted through software, resulting in reduced capital expenses and/or operating expenses. NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral.

In one example, system 100 can be deployed in 5G networks that provide enhanced mobile broadband, for example, ultra high bandwidth (e.g., 20 Gbps), high spectral efficiency (e.g., 3.5× of LTE), ultra dense networks, and/or energy efficiency. Further, the 5G networks can provide ultra-reliable (e.g., high reliability greater than 99.999%) and low latency communications (e.g., ultra low latency of ∞1 msec and/or low network access and synchronization time). Furthermore, the 5G networks can facilitate massive machine type communication (e.g., ultra high density ($10^6$/ sq km), long battery life (10 years+), high system gain (better than narrow band-IoT and/or more efficient than narrow band-IoT).

Figure 2:
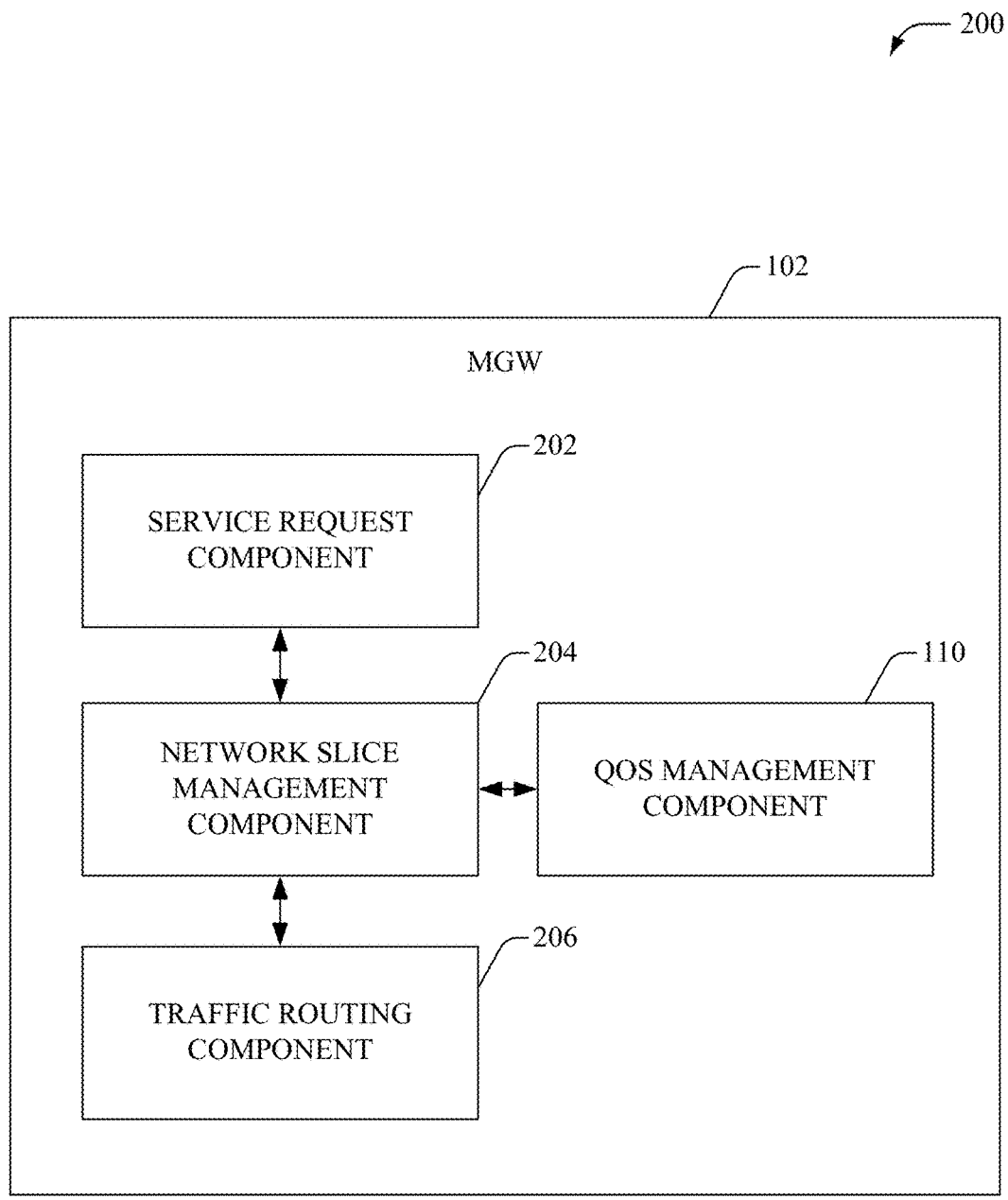
FIG. 2 illustrates an example system for managing core network slices based on QoS levels.

Referring now to FIG. 2, there illustrated is an example system 200 for managing core network slices based on QoS levels, in accordance with an aspect of the subject disclosure. It is noted that the mGW 102 and QoS management component 110 can comprise functionality as more fully described herein, for example, as described above with regard to system 100. Although system 200 has been described with respect to a 5G network, it is noted that the subject disclosure is not limited to 5G networks and can be utilized in most any communication network. Moreover, system 200 can be utilized to provide an intelligent, flexible, and dynamic network architecture that can enable both network operators and service/application providers in delivering customized QoS per service.

According to an embodiment, the mGW 102 comprises a service request component 202 that can receive a request for a service (e.g., streaming video, navigation service, content delivery service, emergency service, etc.) from a UE. As an example, the UE can comprise, but is not limited to most any industrial automation device and/or consumer electronic device, for example, a tablet computer, a digital media player, a wearable device, a digital camera, a media player, a cellular phone, a personal computer, a personal digital assistant (PDA), a smart phone, a laptop, a gaming system, set top boxes, home security systems, an Internet of things (IoT) device, a connected vehicle, at least partially automated vehicle (e.g., drones), etc. In one aspect, the QoS management component 110 can assign one or more QoS levels to a communication session associated with the service. As an example, the QoS levels can be determined based on various factors, such as, but not limited to, UE characteristics (e.g., hardware and/or software characteristics), location associated with the UE, route travelled by UE, user experience and/or expectation, type of content delivered during the communication session, policies and/or preferences (e.g., defined by user, network operator, and/or service provider), time/day, subscription data, etc. Moreover, the QoS levels can be updated at most any time, for example, based on detecting a change in one or more of the factors.

In an aspect, the service request component 202 can forward the service request and additionally (or optionally) data associated with the request, such as, but not limited to, a device identifier, session identifier, etc. to a service-layer network device (not shown). The service-layer network device can determine information, such as, but not limited to, a nature and/or type of the request, the user that requested it (e.g., enterprise user, single user, group of users, family user, etc.), the device the request has been received from (e.g., device identifier and/or device type/model/make), and/or other related data. As an example, the information can be determined based on an analysis of data in (and/or appended to) the request itself and/or based on information retrieved from a network data store (not shown). Further, the service-layer network device can determine the resources required to respond to the request and provide the resource requirements to a network slice management component 204. It is noted that although system 200 describes the information being determined by a service-layer network device, the subject specification is not that limited and that the information and/or at least a portion of the information can be determined by analysis performed by the MGW 102.

According to an embodiment, based on the resource requirements and/or QoS level(s), the network slice management component 204 can select an existing core network slice, instantiate a new core network slice, and/or update an existing core network slice. Moreover, a traffic routing component 206 can direct communication received from the UE that is related to the service, to the specific core network slice. In one aspect, if a QoS level is changed during the data session, the core network slice management component 204 can select a new and/or instantiate a new core network slice (and/or update the existing core network slice) based on the change in the QoS level. Further, the traffic routing component 206 can direct subsequent communication associated with the data session to the new (or updated) core network slice.

Figure 3:
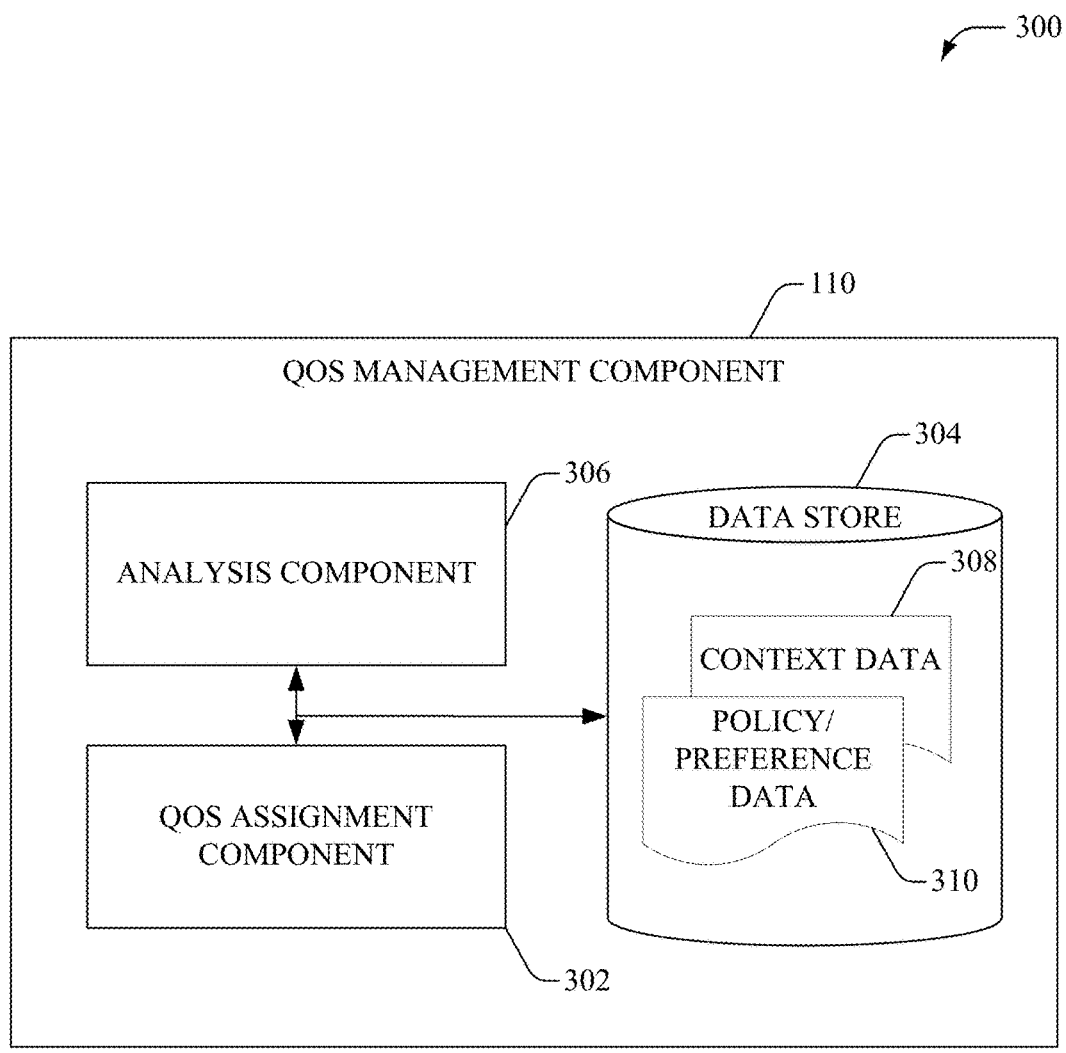
FIG. 3 illustrates an example system that facilitates multi-level QoS assignments during content delivery.

Referring now to FIG. 3, there illustrated is an example system 300 that facilitates multi-level QoS assignments during content delivery, in accordance with an aspect of the subject disclosure. It is noted that the QoS management component 110 can comprise functionality as more fully described herein, for example, as described above with regard to systems 100 and 200. In one example, the QoS management component 110 can comprise a QoS assignment component 302 that can determine QoS levels for different portions of a data session, for example, a content delivery session.

According to an aspect, an analysis of information stored within data store 304 and/or accessed from a network data store (not shown) can be utilized to determine QoS levels that are to be assigned to different parts/segments of a data session (e.g., a content delivery session) associated with a requested service. Moreover, multiple levels of QoS can be dynamically assigned across the entire session of the content delivery to enhance and/or improve user experience. Typically, during a session of content delivery, a user experience and/or expectation can vary. Accordingly, the QoS level can be dynamically adjusted to correspond to the user experience and/or expectation. For example, at the beginning and/or during an introduction portion of a content delivery session (e.g., media streaming), the user expectation and/or expectation can be low, for example, since the user is unfamiliar with the subject and accordingly, a first QoS level corresponding to a low resolution and/or quality (e.g., less than a defined threshold) can be set. However, when the content delivery session is entering into the highlight and/or key portion of the content delivery session, the user experience and/or expectation can increase, and accordingly, a second QoS level corresponding to a high resolution and/or quality (e.g., greater than the defined threshold) can be set. In an aspect, an analysis component 306 can evaluate information, such as, but not limited to context data 308 associated with the session (e.g., type of user, type of the requesting device, hardware/software characteristics of the requesting device, time, location of the requesting device, type of content being delivered, priority and/or importance of the content, etc.) and/or policy/preference data 310 (e.g., defined by a user, network operator, content provider, etc.) to determine user experience and/or expectation. Based on the user experience and/or expectation, the QoS assignment component 302 can set appropriate QoS levels for the different portions/segments of the content delivery session.

Consider an example scenario, wherein a user is watching a movie (e.g., streaming a movie video from a content provider). In this example scenario, the analysis component 306 can determine, based on analysis of the video content and/or user-defined policy, that a higher resolution is important at specific times/scenes (e.g., to view critical details clearly, at a climax scene, etc.) while a lower resolution can be utilized at other times/scenes that are not as important. Accordingly, the QoS assignment component 302 can assign a first QoS level for the important scenes that is higher than a second QoS level that is assigned for the unimportant scenes. In another example scenario, the analysis component 306 can determine device characteristics (e.g., screen size, maximum screen resolution, etc.) of a device on which the content is being (or is to be) presented. For example, if a user is watching a streaming video on smartphone that has a smaller screen than a smart television, the QoS assignment component 302 can set a first QoS level, for the portion of the video that is to be displayed via the smartphone, that is lower than a second QoS level set for the portion of the video that is to be displayed via the smart television (e.g., when a user switches devices to watch the video). In this example scenario, the user can predefine a policy that defines a change in QoS levels from level X to level Y (e.g., X<Y), when the user switches from a smaller screen (e.g., smartphone) to a larger screen (e.g., smart television). In yet another example, different QoS levels can be utilized for different types of content, for example, a low resolution can be set (e.g., by the QoS assignment component 302) for a portion in a newscast, during which a weatherman is presenting the weather report; while a high resolution can be set (e.g., by the QoS assignment component 302) for a portion in the newscast, during which a live clip for breaking news is being presented.

According to an embodiment, the user experience (and/or expectation) and/or QoS levels can be updated at most any time. In one example, the user experience (and/or expectation) and/or QoS levels can be updated based on feedback data received from the requesting UE and/or user during the content delivery session, and/or in response to determining a change in the context data 308. It is noted that the data store 304 can include volatile memory(s) or nonvolatile memory(s), or can include both volatile and nonvolatile memory(s). Examples of suitable types of volatile and non-volatile memory are described below with reference to FIG. 9. The memory (e.g., data stores, databases) of the subject systems and methods is intended to include, without being limited to, these and any other suitable types of memory. Although FIG. 3 depicts the data store 304 being part of the QoS management component 110, the subject specification is not that limited and the data store 304 can be partially included within the QoS management component 110 and/or externally coupled to the QoS management component 110.

Figure 4:
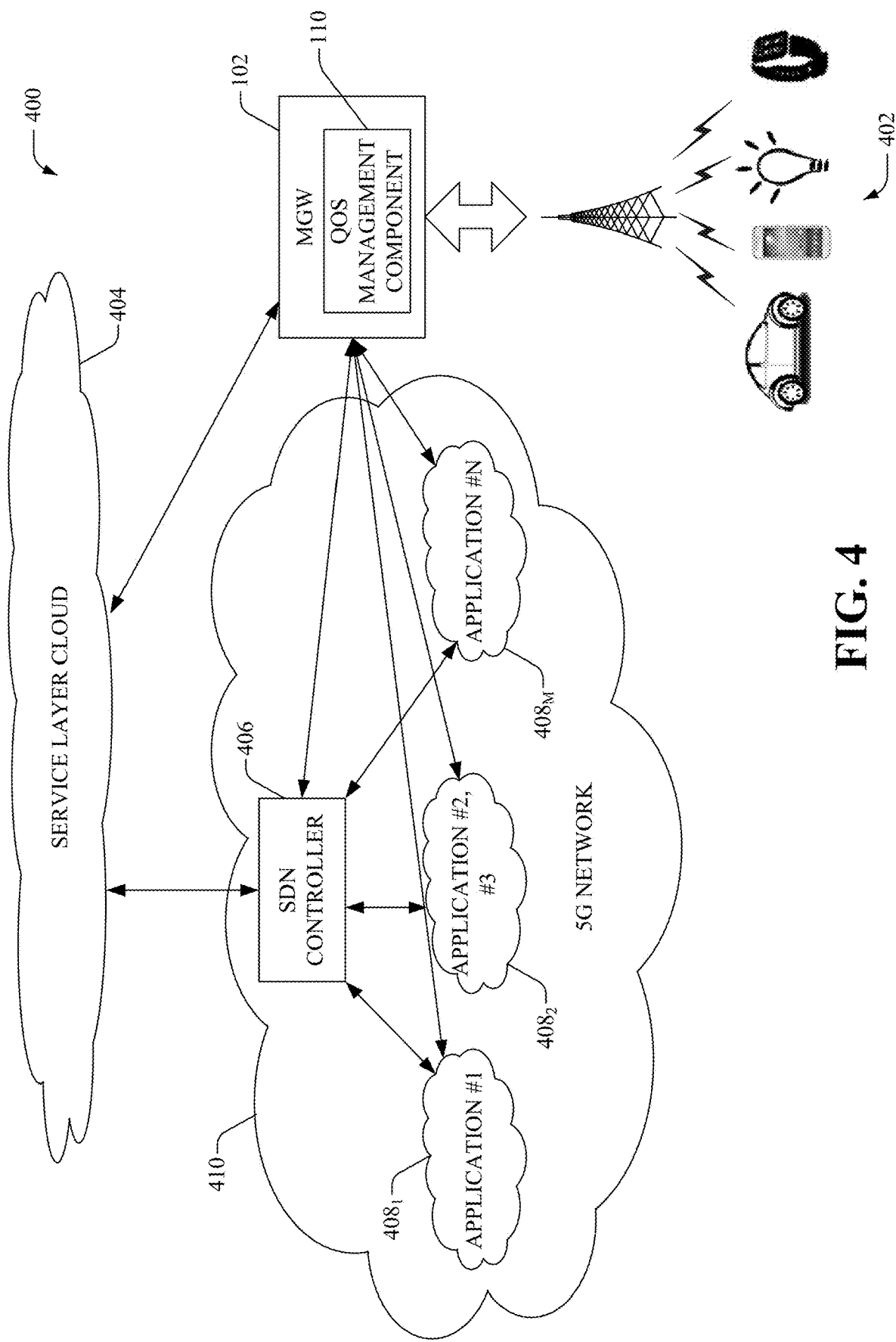
FIG. 4 illustrates an example system that provides dynamic QoS management for dynamic network slice instantiation in a 5G network.

Referring now to FIG. 4, there illustrated is an example system 400 that provides dynamic QoS management for dynamic core network slice instantiation in a 5G network, according to an aspect of the subject disclosure. It is noted that the mGW 102 and QoS management component 110 can comprise functionality as more fully described herein, for example, as described above with regard to systems 100-300. Although system 400 has been described with respect to a 5G network, it is noted that the subject disclosure is not limited to 5G networks and can be utilized in most any communication network.

According to an aspect, the mGW 102 can receive a service request from one (or more) of the UEs 402 (e.g., smartphones, smart watches, smart wearables, smart appliances, connected cars, etc.). Although only four UEs are depicted in FIG. 4, it is noted that the subject disclosure is not that limited and that a greater or fewer number of UEs can be served by the mGW 102. The services requested by the UEs 402 can be associated with a wide range of applications that can have different QoS requirements. In one example, the mGW 102 can forward the service request with data such as, but not limited to, a UE identifier, to a service layer cloud 404. It is noted that the term "cloud" as used herein can refer to a set of servers, communicatively and/or operatively coupled to each other, that host a set of applications utilized for servicing user requests. In general, the cloud computing resources can communicate with user/network devices via most any wired and/or wireless communication network to provide access to services that are based in the cloud and not stored locally (e.g., on the user/network device). A typical cloud-computing environment can include multiple layers, aggregated together, that interact with each other to provide resources for end-users/network devices. Continuing with the example, the service layer cloud 404 can query a user profile database (not shown) to determine parameters, such as, but not limited to, device type, service type, content type, and/or subscriber type (e.g., enterprise subscriber, single subscriber, family subscriber, etc.). Based on the parameters, the service layer cloud 404 can provide a command to a SDN controller 406 and/or the mGW 102 to facilitate instantiation of network slices (e.g., $408_1$-$408_M$; wherein M is most any natural number) of the core 5G network 410, for the requested service. The SDN controller 406 and/or the mGW 102 can forward traffic (e.g., control plane and user plane data) associated with the service to a specific network slice (e.g., $408_1$-$408_M$), and provision the appropriate network application resources for the network slice according to QoS level(s) assigned by the QoS management component 110. In one aspect, the instantiated network slices (e.g., $408_1$-$408_M$) can be reused for different applications.

The QoS management component 110 can determine QoS levels that are to be utilized for a particular service and the mGW 102 can connect to an appropriate network slice that can provide the determined QoS level. In one example, if the QoS level does not exist in an existing core network slice, then a new core network slice can be instantiated for the specific service. Alternatively, if the QoS level doesn't exist in an existing core network slice, then the existing core network slice can be updated to provide the specified QoS level. As seen in FIG. 4, network slice $408_1$ can be utilized for traffic associated with application/service #1, network slice $408_2$ can be utilized for traffic associated with application/service #2 and #3, network slice $408_M$ (e.g., wherein M is most any natural number) can be utilized for traffic associated with application/service # N, and so on. In one aspect, the network slices (e.g., $408_1$-$408_M$) can have different QoS provisioned for the slices.

In an embodiment, system 400 can provide network initiated multi-level QoS for content delivery. Moreover, variable and/or multiple QoS levels can be assigned (e.g., by the QoS management component 110) to a content delivery session requested by one of the UEs 402, in order to improve user experience. As an example, during the session of content delivery, the QoS level can be dynamically adjusted according to a change in the user experience and/or expectation. In one aspect, the content can be partitioned into multiple segments and different QoS levels can be assigned to the different segments (e.g., based on user experience and/or preference associated with the segment). The user experience can be defined, moderated, and/or adjusted according to an emotion level of the user (e.g., determined and/or predicted based on various factors, such as, but not limited to, historical data, current time/date, type of content, etc.). As an example, user experience and/or expectation can be determined based on information, such as, but not limited to, device related data, time related data, service related data, location related data, etc.

System 400 provides a truly flexible architecture wherein multiple levels of QoS can be dynamically assigned across an entire session of the content delivery to ensure optimal user experience. Additionally, the QoS level can be adjusted according to user preference/policies to further enhance user experience.

Figure 5:
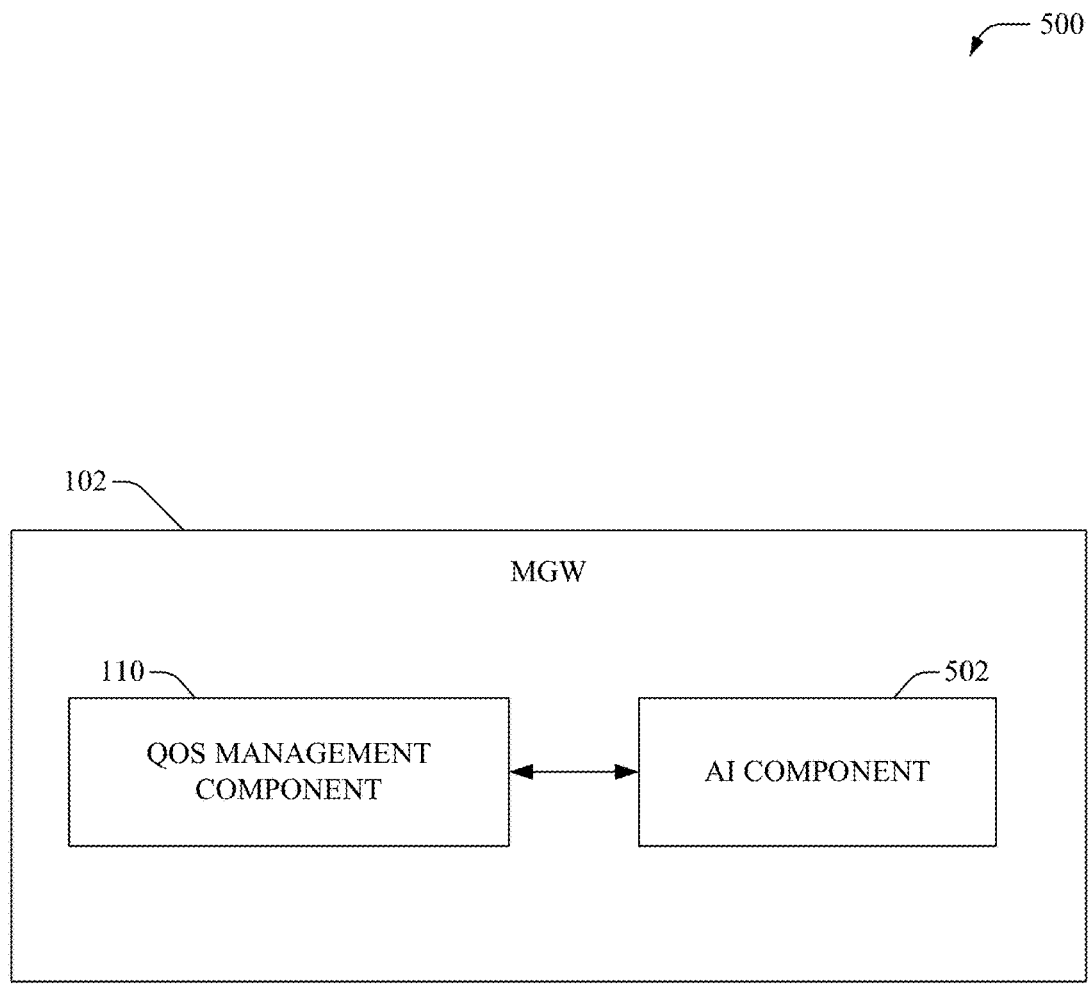
FIG. 5 illustrates an example system that facilitates automating one or more features in accordance with the subject embodiments.

Referring now to FIG. 5, there illustrated is an example system 500 that employs an artificial intelligence (AI) component (502) to facilitate automating one or more features in accordance with the subject embodiments. It can be noted that the mGW 102 and the QoS management component 110 can comprise functionality as more fully described herein, for example, as described above with regard to systems 100-400.

In an example embodiment, system 500 (e.g., in connection with managing and controlling resources based on multiple/varying QoS levels) can employ various AI-based schemes (e.g., intelligent processing/analysis, machine learning, etc.) for carrying out various aspects thereof. For example, a process for determining which core network slices to select, instantiate, and/or update, determining QoS levels for specific type of traffic and/or device, determining user expectation and/or satisfaction, etc. can be facilitated via an automatic classifier system implemented by AI component 502. Moreover, the AI component 502 can various exploit artificial intelligence (AI) methods or machine learning methods. Artificial intelligence techniques can typically apply advanced mechanisms—e.g., decision trees, neural networks, regression analysis, principal component analysis (PCA) for feature and pattern extraction, cluster analysis, genetic algorithm, or reinforced learning—to a data set. In particular, AI component 702 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 502 can be used to automatically learn and perform a number of functions, comprising but not limited to determining according to a predetermined criteria, a core network slice to handle traffic associated with a specific service, a QoS level a for specific service, a QoS level a for specific segment of content to be delivered during a content delivery session, user expectation and/or satisfaction, a QoS level corresponding to user expectation and/or satisfaction metrics, etc. The criteria can comprise, but is not limited to, historical patterns and/or trends, user and/or network operator preferences and/or policies, application/service provider preferences, predicted traffic flows, event data, latency data, reliability/availability data, current time/date, and the like.

Figure 6:
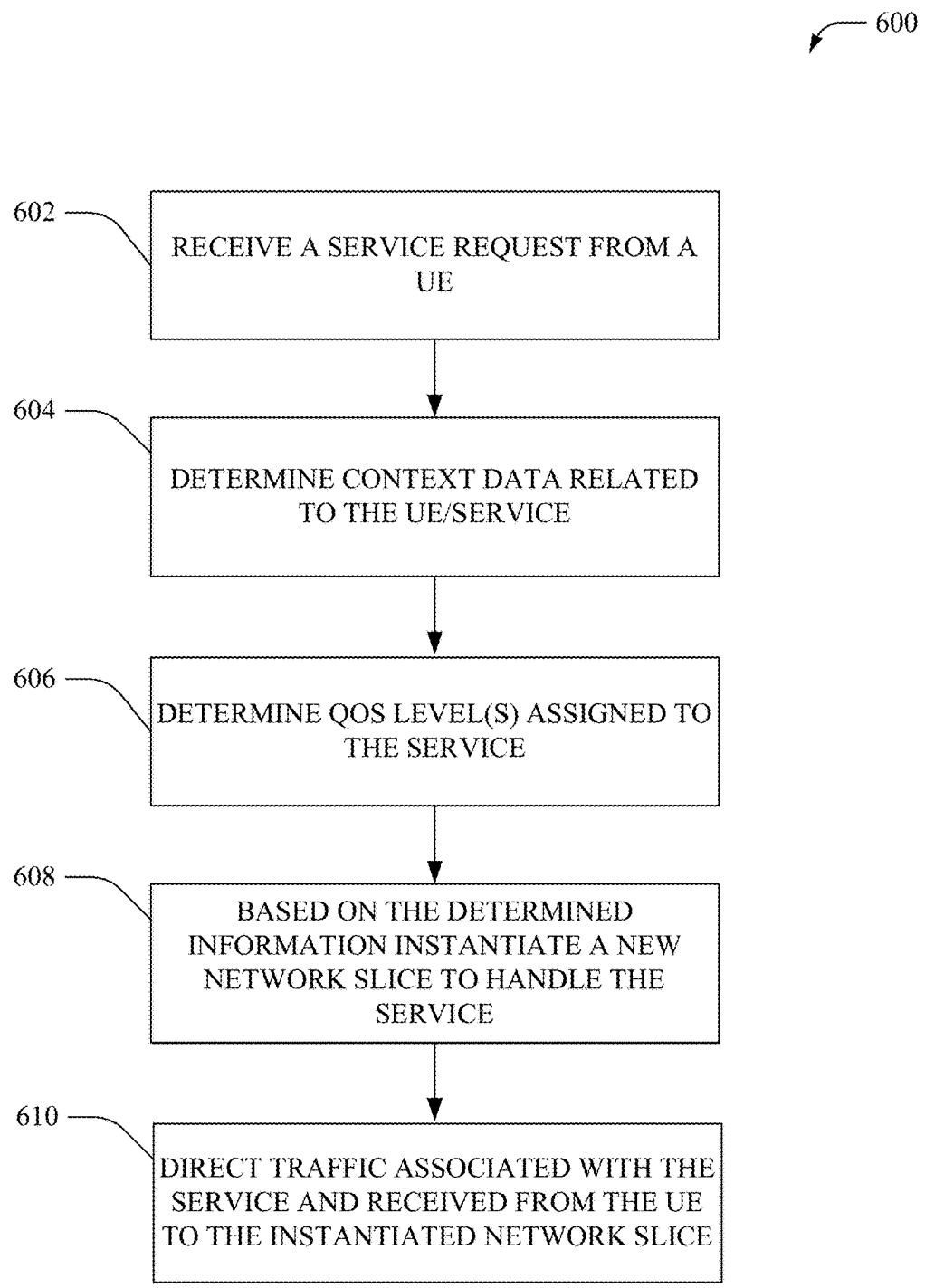
FIG. 6 illustrates an example method that facilitates instantiation of core network slices based on QoS data.
Figure 7:
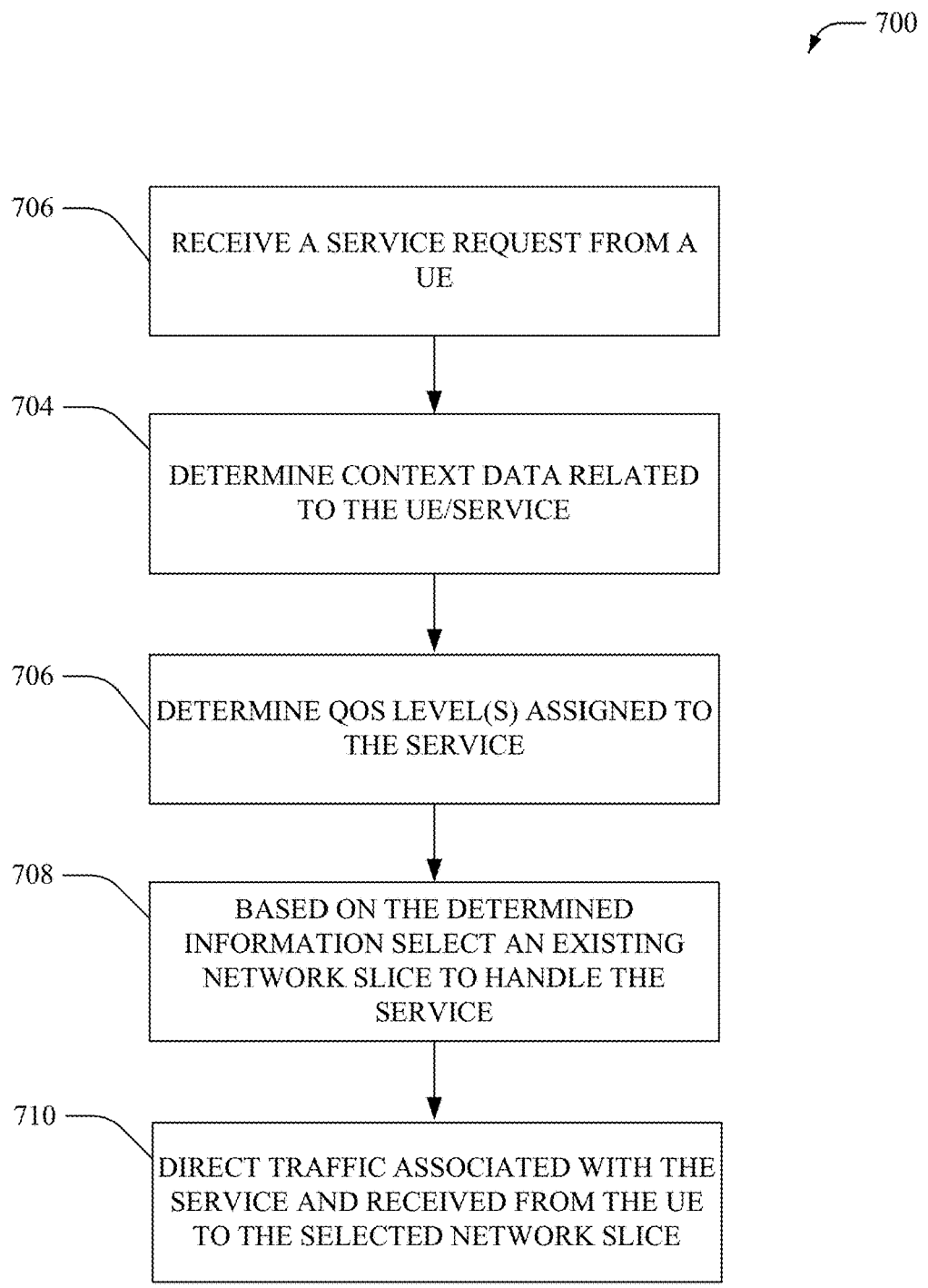
FIG. 7 illustrates an example method that facilitates selection of core network slices based on QoS data.
Figure 8:
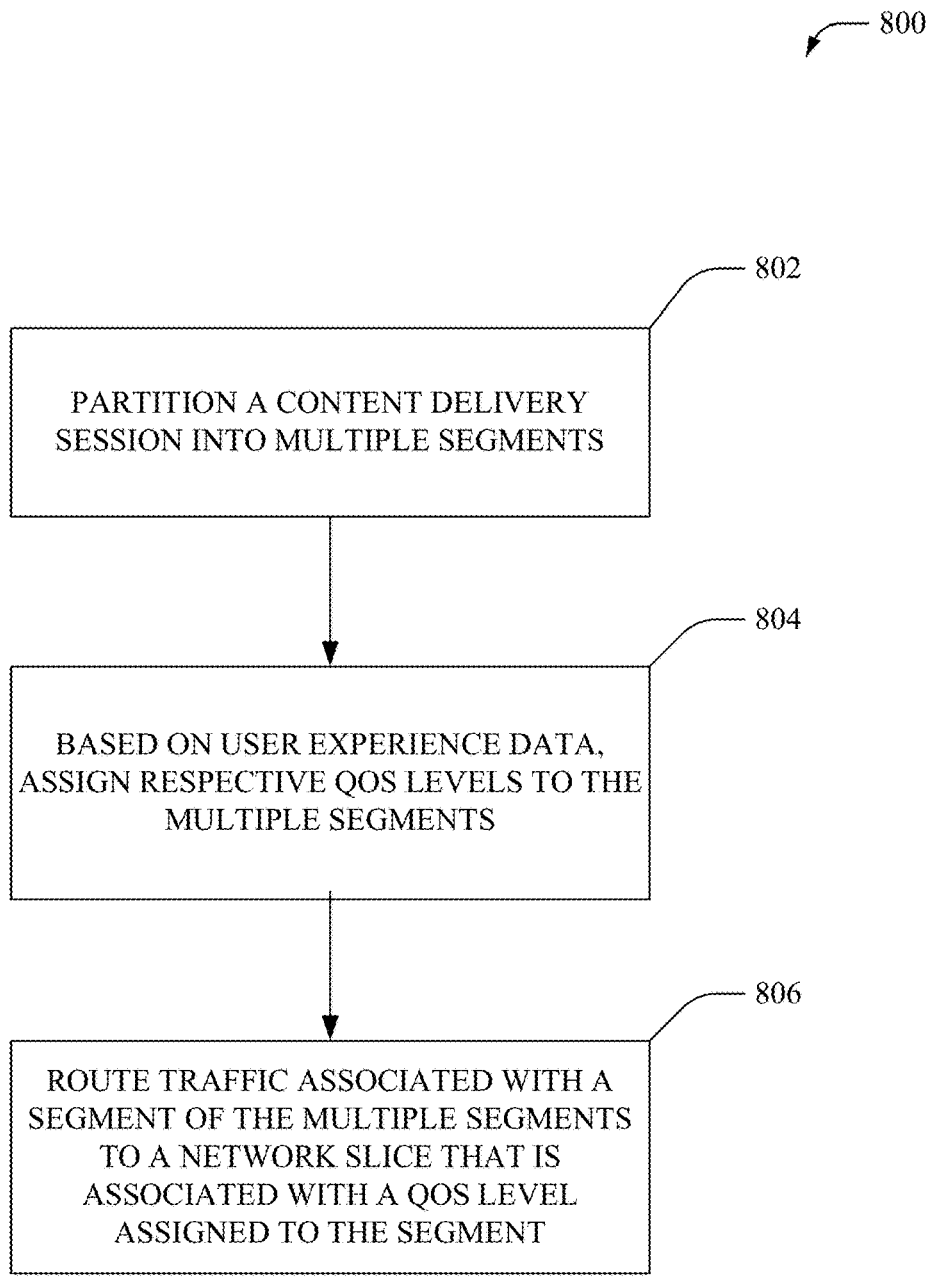
FIG. 8 illustrates an example method that provides multi-level QoS assignments during a content delivery session.

FIGS. 6-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6 there illustrated is an example method 600 that facilitates instantiation of core network slices based on QoS data, according to an aspect of the subject disclosure. In an aspect, method 600 can be implemented by one or more access network devices (e.g., mGW 102) of a communication network (e.g., cellular network). At 602, a service request can be received from a UE. At 604, context data (e.g., type of service, type of user, type of UE, etc.) related to the UE/service can be determined. As an example, the context data can be received from a service layer cloud. Further, at 606, one or more QoS levels assigned to the service can be determined. For example, the QoS level(s) can be received from a QoS management component that determines the QoS level(s) based on user experience and/or expectation. At 608, based on the determined information (e.g., context data and/or QoS level(s)), a new (dedicated) network slice of a core network can be instantiated to handle the service. Alternatively, an existing core network slice can be updated to handle the service. In one aspect, the core network slice can be customized to handle the service requirements and/or guarantee the QoS level(s). At 610, traffic associated with the service and received from the UE can be directed to the instantiated core network slice.

FIG. 7 illustrates an example method 700 that facilitates selection of core network slices based on QoS data, according to an aspect of the subject disclosure. As an example, method 700 can be implemented by one or more access network devices (e.g., mGW 102) of a communication network (e.g., cellular network). At 702, a service request can be received from a UE. At 704, context data (e.g., type of service, type of user, type of UE, etc.) related to the UE/service can be determined. As an example, the context data can be received from a service layer cloud. Further, at 706, one or more QoS levels assigned to the service can be determined. For example, the QoS level(s) can be received from a QoS management component that determines the QoS level(s) based on user experience and/or expectation. At 708, based on the determined information (e.g., context data and/or QoS level(s)), an existing network slice of a core network can be selected to handle the service. In one aspect, a core network slice that is determined to satisfy the service requirements and/or provide the QoS level(s) can be selected from a group of instantiated core network slices. At 710, traffic associated with the service and received from the UE can be directed to the selected core network slice.

FIG. 8 illustrates an example method 800 that provides multi-level QoS assignments during a content delivery session, according to an aspect of the subject disclosure. As an example, method 800 can be implemented by one or more network devices (e.g., access network device) of a communication network (e.g., cellular network). At 802, a content delivery session can be partitioned into multiple segments. At 804, respective QoS levels can be assigned to the multiple segments based on user experience (and/or expectation) data. Additionally or alternatively, the respective QoS levels can be assigned to the multiple segments based on user defined policies. For example, during a movie streaming session, the scenes in the movies can be categorized and different QoS levels can be assigned to different categories of scenes (e.g., QoS is set to "High" during an action scene or a romantic scene so the user can view high quality video). At 806, traffic associated with a segment of the multiple segments can be routed to a network slice of a core network that is associated with a QoS level that has been assigned to the segment.

Figure 9:
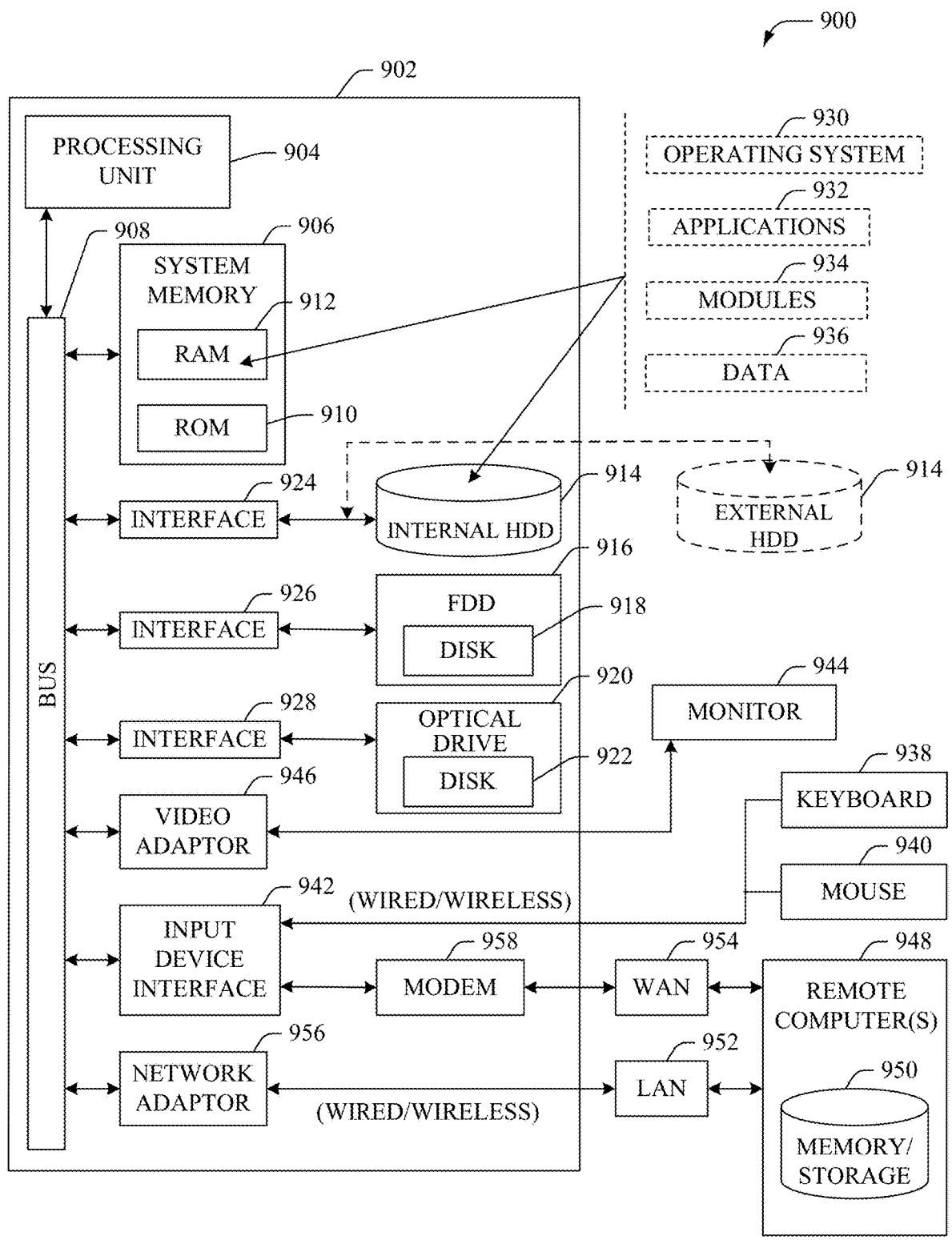
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 9, the example environment 900 for implementing various aspects of the specification comprises a computer 902, the computer 902 comprising a processing unit 904, a system memory 906 and a system bus 908. As an example, the component(s), application(s) server(s), equipment, system(s), interface(s), gateway(s), controller(s), node(s), entity(ies), function(s), cloud(s) and/or device(s) (e.g., mGW 102, network slice(s) 104, core network 106, QoS management component 110, service request component 202, network slice management component 204, traffic routing component 206, QoS assignment component 302, data store 304, analysis component 306, UE(s) 402, service layer cloud 404, SDN controller 406, core network slices 1-N ($408_1$-$408_N$), AI component 502, etc.) disclosed herein with respect to systems 100-500 can each comprise at least a portion of the computer 902. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, comprising an operating system 930, one or more application programs 932, other program modules 934 and program data 936. All or portions of the operating system, applications, modules, and/or data can also be cached in the RAM 912. It is noted that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also comprise a wireless access point disposed thereon for communicating with the wireless adapter 956.

When used in a WAN networking environment, the computer 902 can comprise a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be noted that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
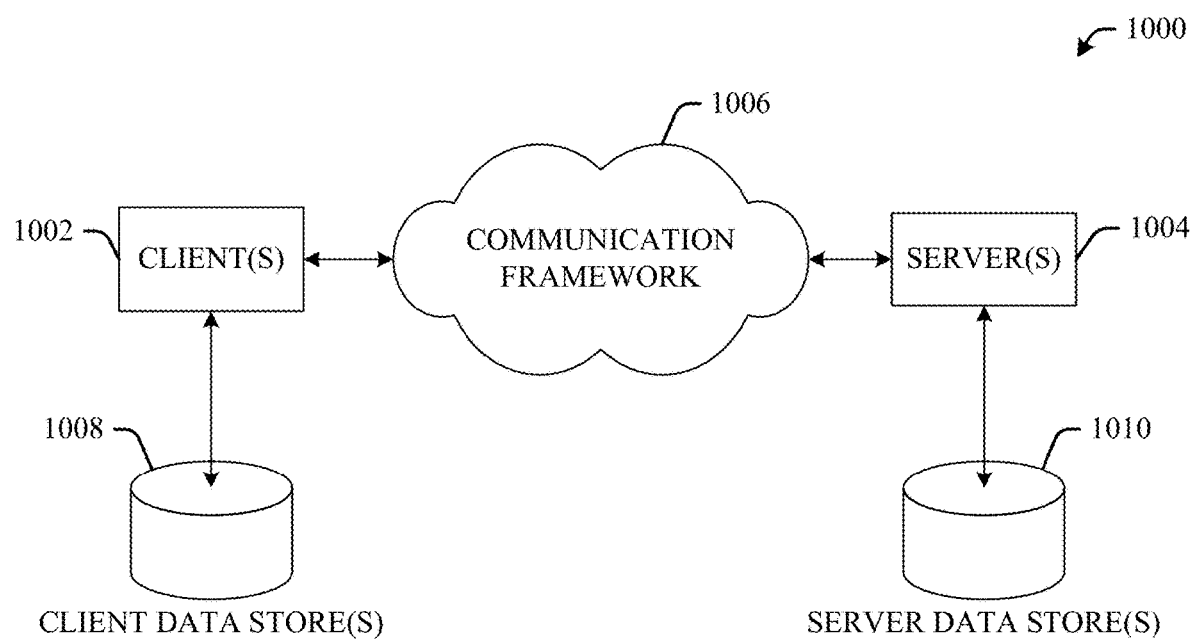
FIG. 10 illustrates a schematic block diagram of a computing environment in accordance with the subject specification

Referring now to FIG. 10, there is illustrated a schematic block diagram of a computing environment 1000 in accordance with the subject specification. The system 1000 comprises one or more client(s) 1002. The client(s) 1002 can be hardware and/or software (e.g., threads, processes, computing devices).

The system 1000 also comprises one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may comprise a cookie and/or associated contextual information, for example. The system 1000 comprises a communication framework 1006 (e.g., a global communication network such as the Internet, cellular network, etc.) that can be employed to facilitate communications between the client(s) 1002 and the server(s) 1004.

Communications can be facilitated via a wired (comprising optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
partitioning content, to be transferred to a user equipment during a communication session associated with a content delivery service, into segments;
determining assignment data indicative of an assignment of respective quality of service levels to the segments of the content, wherein a first segment from the segments of the content is assigned a first quality of service level based on first context data associated with the first segment, wherein a second segment from the segments of the content is assigned a second quality of service level based on second context data associated with the second segment, wherein the first segment is an introductory segment of the content and the second segment is a key portion of the content, and wherein the first quality of service level is lower than the second quality of service level; and
based on the assignment data, instantiating network slices of a network corresponding to the respective quality of service levels, wherein a network slice of the network slices comprises a virtual replication of resources of the network that are employable to enable the content delivery service, and wherein traffic associated with the first segment or the second segment is to be directed to the network slice.

2. The system of claim 1, wherein the network slices are first network slices and the operations further comprise:
based on feedback data received from the user equipment during the communication session, updating the respective quality of service levels to facilitate an instantiation of second network slices of the network that are employable to enable the content delivery service, wherein the feedback data comprises user experience data.

3. The system of claim 1, wherein network application resources for the network slice are provisioned based on a quality of service level of the respective quality of service levels.

4. The system of claim 1, wherein the determining the assignment data comprises determining the assignment data based on user experience data associated with the communication session.

5. The system of claim 1, wherein the determining the assignment data comprises determining the assignment data based on user expectation data associated with the communication session.

6. The system of claim 1, wherein a request for the content delivery service is received from the user equipment and wherein the determining the assignment data comprises determining the assignment data based on policy data associated with a subscriber account related to the user equipment.

7. The system of claim 1, wherein a request for the content delivery service is received from the user equipment and wherein the determining the assignment data comprises determining the assignment data based on characteristic data that represents a device characteristic of the user equipment.

8. The system of claim 1, wherein a request for the content delivery service is received from the user equipment and wherein the determining the assignment data comprises determining the assignment data based on location data that represents a geographical location of the user equipment.

9. The system of claim 1, wherein the respective quality of service levels are varied during the communication session.

10. A method, comprising:
partitioning, by a system comprising a processor, content to be delivered during a communication session associated with a content delivery service to generate a first portion of the content and a second portion of the content;
assigning, by the system, a first quality of service level to the first portion based on first context data associated with the first portion;
assigning, by the system, a second quality of service level to the second portion based on second context data associated with the second portion, wherein the first portion is an introductory portion of the content and the second portion is a key portion of the content, and wherein the first quality of service level is lower than the second quality of service level;
based on the first quality of service level, instantiating a first network slice of a network, wherein the first network slice comprises a first virtual replication of resources of the network that are employable to enable the content delivery service, and wherein first traffic associated with the first portion is directed to the first network slice; and
based on the second quality of service level, instantiating a second network slice of the network, wherein the second network slice comprises a second virtual replication of resources of the network that are employable to enable the content delivery service, and wherein second traffic associated with the second portion is directed to the second network slice.

11. The method of claim 10, wherein the assigning comprises assigning the first quality of service level based on user experience data associated with the communication session.

12. The method of claim 10, wherein the assigning comprises assigning the first quality of service level based on user expectation data associated with the communication session.

13. The method of claim 10, further comprising:
receiving, by the system, request data indicative of a request for the content delivery service from a user equipment coupled to an access point device of the network.

14. The method of claim 13, wherein the assigning comprises assigning the first quality of service level based on location data indicative of a location of the user equipment.

15. The method of claim 13, wherein the assigning comprises assigning the first quality of service level based on information indicative of a hardware characteristic of the user equipment.

16. A non-transitory machine-readable storage medium, comprising executable instructions that, when executed by a processor, facilitate performance of operations, comprising:
in response to receiving, from a user equipment coupled to a network device of a network, request data indicative of a request for a content delivery service associated with an application, determining segments of content that is to be transferred during a communication session associated with the content delivery service, wherein the determining comprises partitioning the content into the segments based on respective context data associated with the segments, wherein a first segment of the segments is an introductory segment of the content and a second segment of the segments is a key portion of the content;
determining a first quality of service level for the first segment and a second quality of service level for the second segment, wherein the first quality of service level is lower than the second quality of service level; and
instantiating network slices of a network corresponding to the respective quality of service levels, wherein a network slice of the network slices comprises a virtual replication of resources of the network that are employable to enable the service, and wherein traffic associated with the first segment or the second segment is to be directed to the network slice.

17. The non-transitory machine-readable storage medium of claim 16, wherein the determining the first quality of service level comprises determining the first quality of service level based on location data indicative of a location of the user equipment.

18. The non-transitory machine-readable storage medium of claim 16, wherein the determining the first quality of service level comprises determining the first quality of service level based on timing data indicative of a time of day.

19. The non-transitory machine-readable storage medium of claim 16, wherein the determining the first quality of service level comprises determining the first quality of service level based on policy data indicative of a policy associated with the user equipment.

20. The non-transitory machine-readable storage medium of claim 16, wherein the operations further comprise:
varying the first quality of service level or the second quality of service level during the communication session.

* * * * *